US 9,423,258 B2

(12) United States Patent
Kabel et al.

(10) Patent No.: US 9,423,258 B2
(45) Date of Patent: Aug. 23, 2016

(54) MARINE NAVIGATION DEVICE WITH IMPROVED CONTOUR LINES

(71) Applicant: Garmin Switzerland GmbH, Schaffhausen (CH)

(72) Inventors: Darrin W. Kabel, Overland Park, KS (US); Michael A. Cowen, Overland Park, KS (US)

(73) Assignee: Garmin Switzerland GmbH (CH)

( * ) Notice: Subject to any disclaimer, the term of this patent is extended or adjusted under 35 U.S.C. 154(b) by 77 days.

(21) Appl. No.: 14/449,688

(22) Filed: Aug. 1, 2014

(65) Prior Publication Data
US 2015/0039222 A1 Feb. 5, 2015

Related U.S. Application Data

(60) Provisional application No. 61/904,909, filed on Nov. 15, 2013, provisional application No. 61/861,883, filed on Aug. 2, 2013.

(51) Int. Cl.
G01C 21/00 (2006.01)
G01C 21/20 (2006.01)

(52) U.S. Cl.
CPC ............................ G01C 21/203 (2013.01)

(58) Field of Classification Search
CPC ........................ B60W 50/00; B60W 50/08
See application file for complete search history.

(56) References Cited

U.S. PATENT DOCUMENTS

| 7,516,011 B1 | 4/2009 | Kabel et al. ............. 701/211 |
| 2002/0038307 A1* | 3/2002 | Obradovic ........... G06K 9/6253 |
| 2005/0288833 A1 | 12/2005 | Motose ...................... 701/21 |
| 2007/0032913 A1* | 2/2007 | Ghoneim ............ B60W 30/16 701/1 |
| 2007/0080961 A1* | 4/2007 | Inzinga ................. G06T 17/05 345/419 |
| 2009/0015389 A1* | 1/2009 | Seehaus ............... G06T 11/203 340/435 |
| 2011/0054784 A1* | 3/2011 | Wood .................... G01C 21/00 701/533 |

(Continued)

FOREIGN PATENT DOCUMENTS

WO WO 2010-024683 3/2010

OTHER PUBLICATIONS

Co-Pending U.S. Appl. No. 14/449,769, filed Aug. 1, 2014 entitled 3D Sonar Display With Semi-Transparent Shading.

(Continued)

Primary Examiner — Rodney Butler
Assistant Examiner — Frederick Brushaber
(74) Attorney, Agent, or Firm — Samuel M. Korte; Max M. Ali

(57) ABSTRACT

A marine navigation device comprises a location determining element, a display, a memory element, and a processing element. The location determining element determines a current geolocation of a marine vessel on a first body of water. The display displays a map representation. The memory element stores digital elevation model data and sonar data for a plurality of bodies of water. The processing element is in communication with the memory element and is configured to select the digital elevation model data or the sonar data from the memory element corresponding to the first body of water, calculate contour line data, the contour line data determining a plurality of contour lines, update the contour line data by selectively removing at least a portion of the contour lines, and generate a map representation including contour lines derived from the updated contour line data, and control the display to visually present the map representation.

35 Claims, 6 Drawing Sheets

(56) References Cited

U.S. PATENT DOCUMENTS

| | | | |
|---|---|---|---|
| 2011/0196555 A1* | 8/2011 | Hennings | B60K 6/52 701/22 |
| 2012/0232719 A1 | 9/2012 | Salmon et al. | 701/2 |
| 2012/0290200 A1 | 11/2012 | Kabel et al. | 701/409 |
| 2013/0096751 A1* | 4/2013 | Riley | B60L 3/12 701/22 |
| 2013/0136309 A1* | 5/2013 | Zhang | G06T 7/2033 382/104 |
| 2013/0274955 A1* | 10/2013 | Rosenbaum | G06F 17/00 701/1 |
| 2014/0046595 A1* | 2/2014 | Segawa | G01C 21/34 701/541 |
| 2015/0276420 A1* | 10/2015 | McGee | G01C 21/3469 701/118 |

OTHER PUBLICATIONS

Printout from http://www.lowrance.com/en-US/Products/Mapping/ published prior to Aug. 1, 2014.

International Search Report and Written Opinion from Corresponding PCT/US2014/049441, filed Aug. 1, 2014.

* cited by examiner

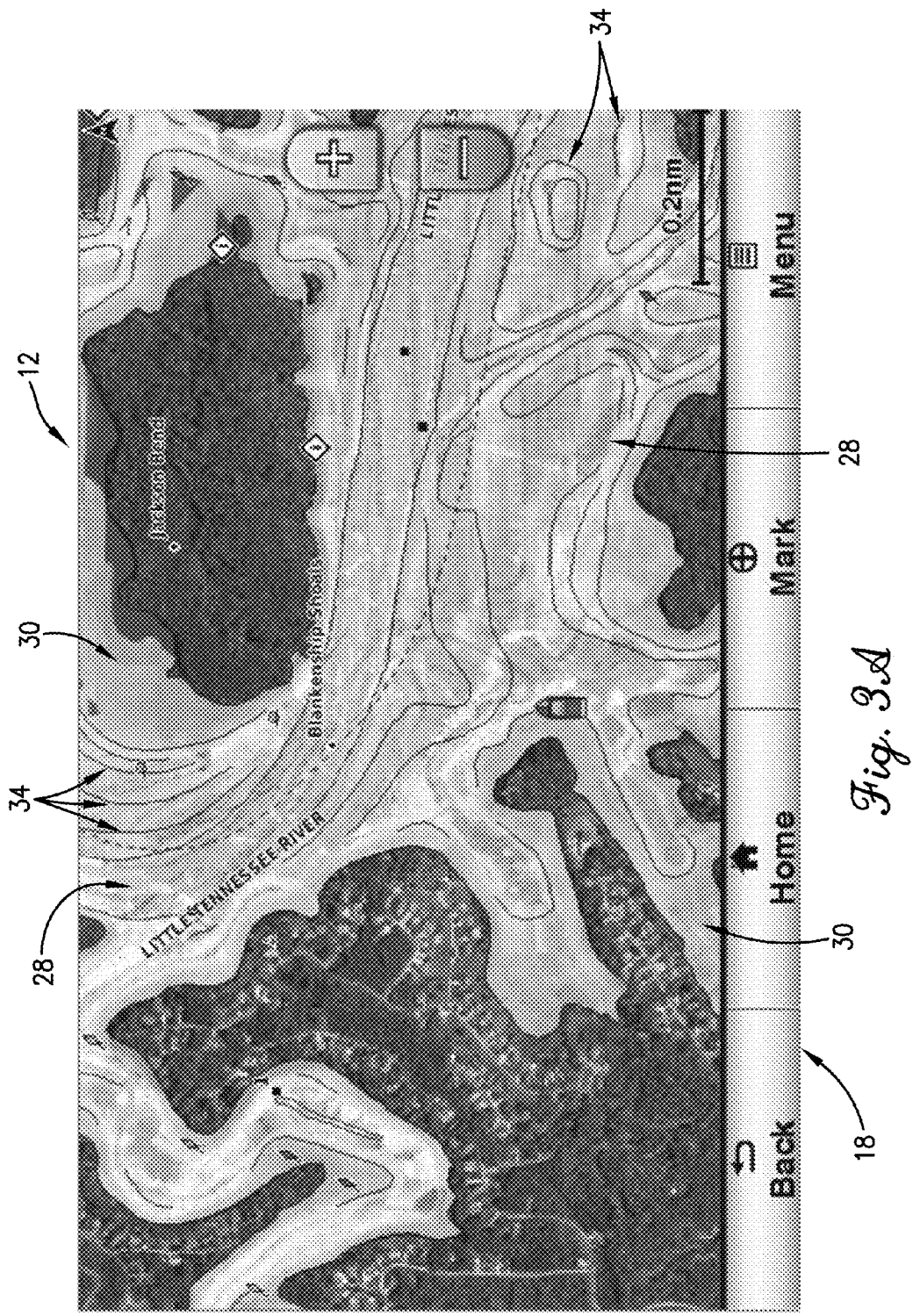

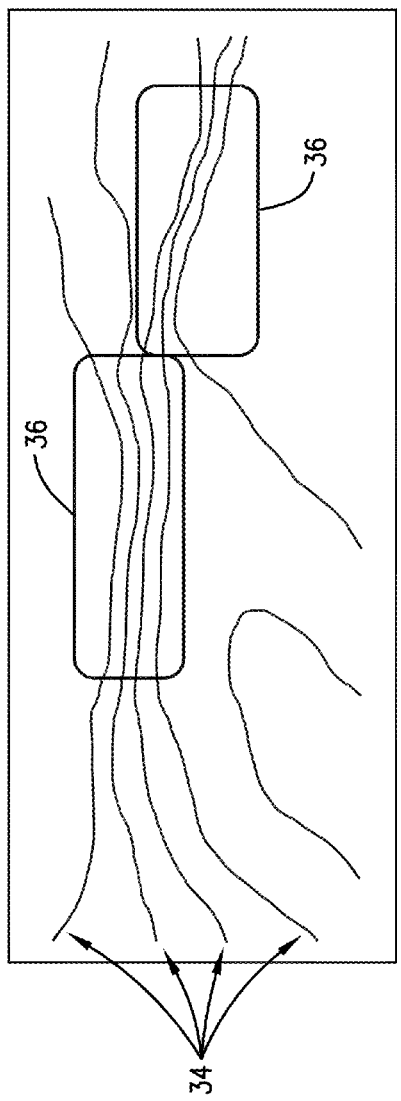
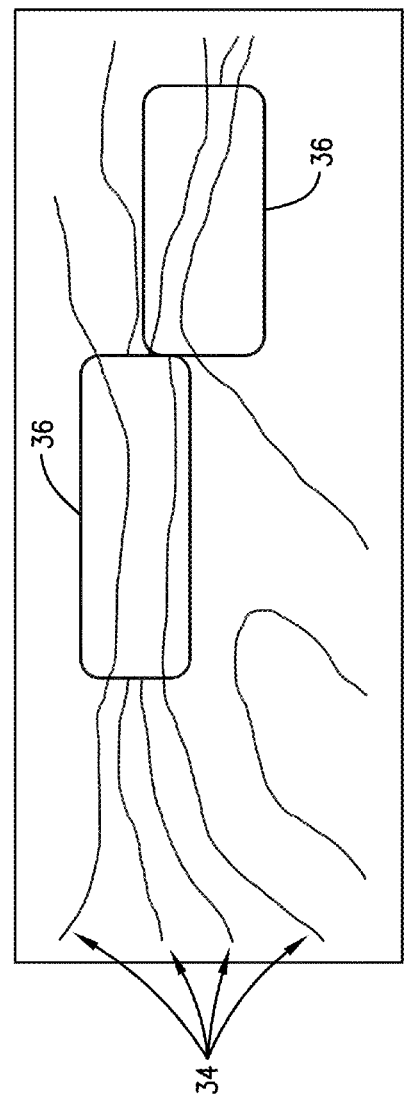

MARINE NAVIGATION DEVICE WITH IMPROVED CONTOUR LINES

RELATED APPLICATIONS

The current non-provisional patent application claims priority benefit, with regard to all common subject matter, of earlier-filed U.S. provisional patent application titled "HYDROGRAPHIC TECHNIQUES", Application Ser. No. 61/861,883, filed Aug. 2, 2013, and earlier-filed U.S. provisional patent application titled "HYDROGRAPHIC TECHNIQUES", Application Ser. No. 61/904,909, filed Nov. 15, 2013. These earlier-filed applications are hereby incorporated by reference into the current application in their entirety.

BACKGROUND

Marine navigation devices often include a display that shows a map of at least a portion of a body of water in the vicinity of the current geolocation of a marine vessel with which the marine navigation device is being utilized. The map may include a representation of the terrain or soil at the bottom of the water with contour lines which indicate locations of the terrain that are at the same depth. Marine navigation devices display contour lines associated with depths of a plurality of geographic areas associated with a body of water. The displayed contour lines are presented in a higher density for areas associated with, large gradients or slopes of the underwater terrain, while flatter underwater regions result in a lower contour line density. Conventional marine navigation devices may remove an entire contour line to reduce the density of contour lines presented on a display.

SUMMARY

Embodiments of the present technology provide a marine navigation device that displays a map for a body of water which includes contour lines to indicate all of the geolocations of the terrain that exist at the same depth of water in the vicinity of a marine vessel. The marine navigation device may increase visibility of other information displayed about the body of water by selectively reducing a portion of the contour lines that are shown. The marine navigation device comprises a location determining element, a display, a memory element, and a processing element. The location determining element determines a current geolocation of a marine vessel on a first body of water. The display displays a map representation. The memory element stores digital elevation model data and sonar data for a plurality of bodies of water.

The processing element is in communication with the memory element and is configured to select the digital elevation model data or the sonar data from the memory element corresponding to the first body of water and calculate contour line data using the digital elevation model data or the sonar data for at least a portion of the first body of water, wherein the contour line data determines a plurality of contour lines, with each contour line indicating all of the geolocations of underwater terrain that exist at a depth of water. The processing element is further configured to update the contour line data by selectively removing at least a portion of the contour lines, generate a map representation of at least a portion of the first body of water corresponding to the current geolocation, wherein the map representation includes contour lines derived from the updated contour line data, and control the display to visually present the map representation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology is described in detail below with reference to the attached drawing figures, wherein:

FIG. 3A is a screen capture from a display of the marine navigation device depicting a map of a body of water, the map including a plurality of contour lines, bottom hardness shading, and safety shading;

FIG. 5 is a view of a portion of the map depicting a plurality of contour lines before contour line thinning has occurred; and FIG. 6 is a view of the portion of the map from FIG. 5 depicting the contour lines after contour line thinning has occurred.

Figure 1:
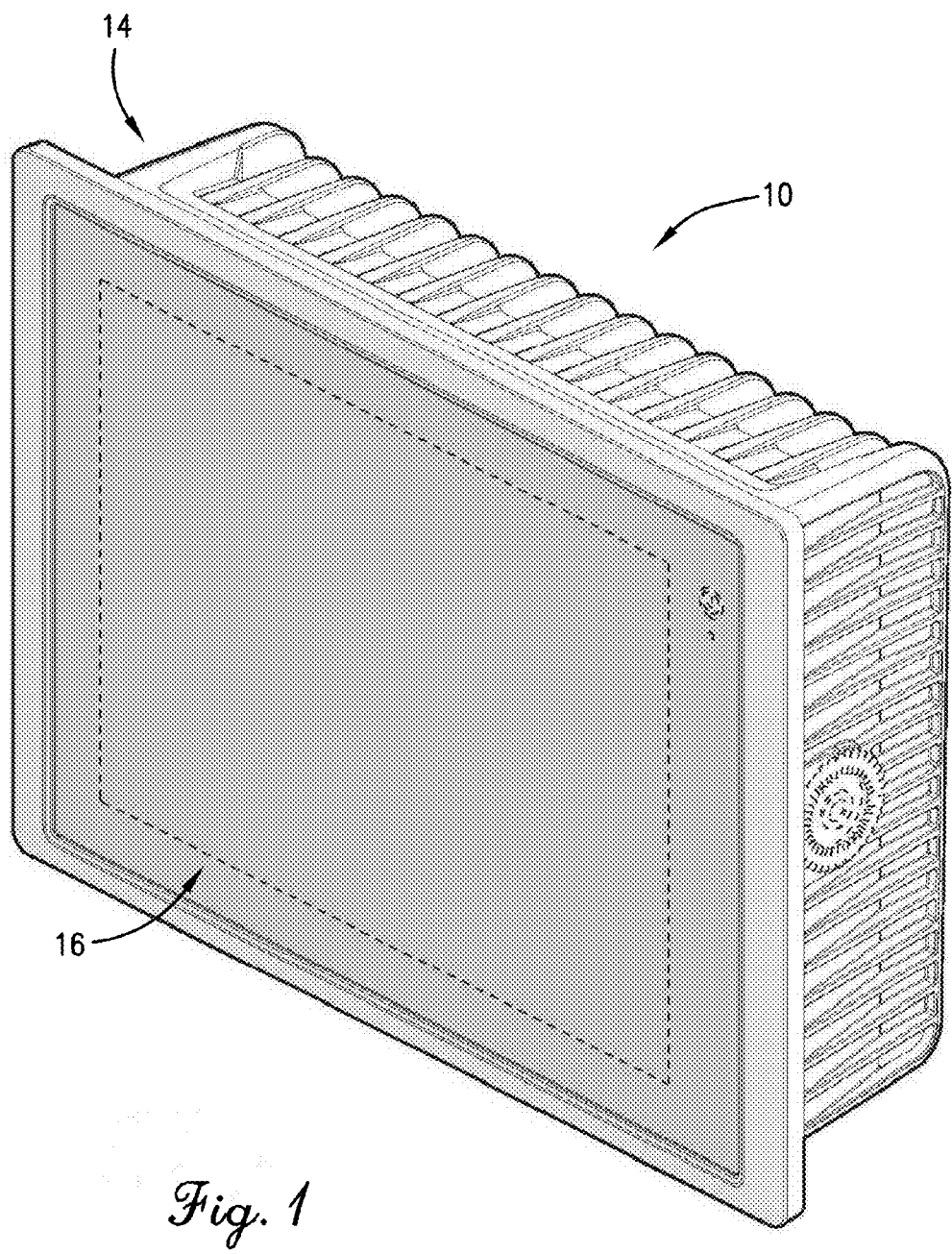
FIG. 1 is a perspective view of a marine navigation device constructed in accordance with various embodiments of the current technology.
Figure 2:
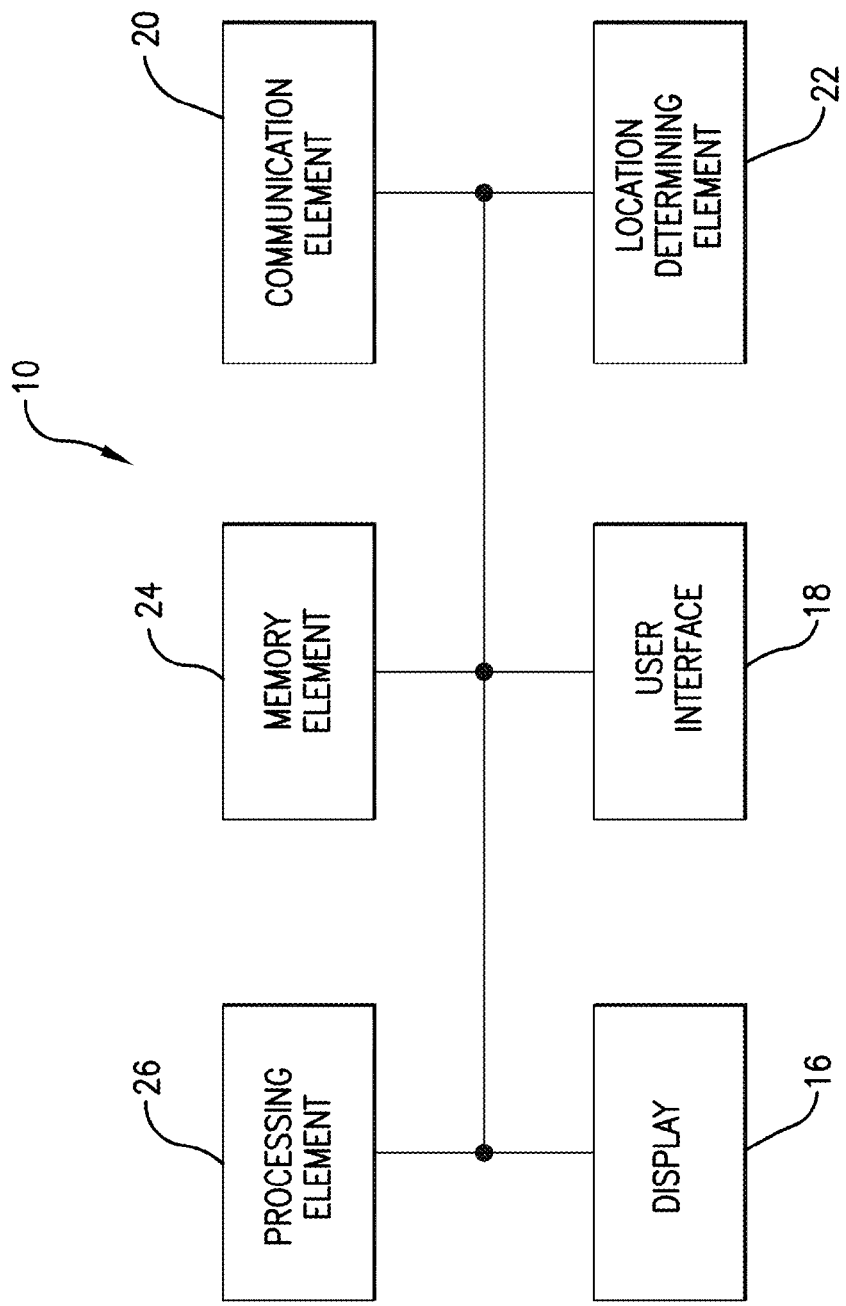
FIG. 2 is a schematic block diagram of various components of the marine navigation device.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a marine navigation device utilized with a marine vessel or water craft for navigating on a body of water. The marine navigation device may be any computing device. For instance, the marine navigation device may be a tablet, cellular phone, or handheld mobile device. The device typically includes a location determining element for determining a current geolocation of the marine vessel. The location determining element may also determine a route for the marine vessel to follow in navigating from the current geolocation to a destination. The device also includes a display which usually displays a map of the body of water in the vicinity of the marine vessel. When appropriate, the display may also show a map of the land adjacent to the body of water. In some instances, representations of the land may include satellite imagery. The display may further show a representation of the marine vessel overlayed on the body of water—typically at a position that indicates the current geolocation of the marine vessel. In some cases, the display may include touchscreen functionality wherein there are a plurality of icons shown on the display that allow a user to adjust the zoom level of the map, change other settings, or look at menus.

The display may further show contour lines on the body of water portion of the map that indicate all of the geolocations of the underwater terrain that exist at the same depth of water. The contour lines may also indicate underwater channels or other features that can help the user navigate the water. The contour lines may be shown at various depth ranges, such as every foot, every two feet, every five feet, and so forth. A density of the contour lines may be defined as the number of lines per unit length or unit area of the display screen. Often, the density increases in areas of the display which correspond to areas of the underwater terrain where there are significant slopes or gradients. For example, if contour lines are presented in increments of 5 feet (e.g., a separate contour line is presented for depths of 25, 30, 35, and 40 feet), a rapid change of depth of 20 feet may result in four contour lines being presented in close proximity to one another. The increased concentration of contour lines for a geographic area may partially obstruct the underlying map content associated with the geographic area. When the density of contour lines becomes too great, then the crowding of contour lines in those areas dominate the map and obstruct the underlying map content. Conventional devices may remove one or more contour lines presented on a display in order to reduce the density of contour lines. Some conventional devices may enable the user to remove contour lines to examine the map content obstructed by contour lines concentrated in an area of the map. The conventional devices do not identify portions of adjacent contour lines such that the portion of each contour line that is obstructing map information provided to a user may be identified and selectively removed.

Embodiments of the technology will now be described in more detail with reference to the drawing figures. Referring initially to FIGS. 1-3B, a marine navigation device 10 is illustrated which is configured to display a map 12 of a body of water that includes contour lines to indicate all of the geolocations of the terrain that exist at the same depth of water in the vicinity of a marine vessel. The marine navigation device 10 may increase visibility of other information displayed about the body of water by selectively reducing a portion of the contour lines that are shown. The marine navigation device 10 broadly comprises a housing 14, a display 16, a user interface 18, a communication element 20, a location determining element 22, a memory element 24, and a processing element 26.

The housing 14, as shown in FIG. 1, generally encloses and protects the other components from moisture, vibration, and impact. The housing 14 may include mounting hardware for removably securing the marine navigation device 10 to a surface within the marine vessel or may be configured to be panel-mounted within the marine vessel. The housing 14 may be constructed from a suitable lightweight and impact-resistant material such as, for example, plastic, nylon, aluminums, or any combination thereof. The housing 14 may include one or more appropriate gaskets or seals to make it substantially waterproof or resistant. The housing 14 may take any suitable shape or size, and the particular size, weight and configuration of the housing 14 may be changed without departing from the scope of the present technology.

The display 16, as shown in FIG. 1, may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 16 may possess a square or a rectangular aspect ratio and may be viewed in either a landscape or a portrait mode. In various embodiments, the display 16 may also include a touch screen occupying the entire screen or a portion thereof so that the display 16 functions as part of the user interface 18. The touch screen may allow the user to interact with the marine navigation device 10 by physically touching, swiping, or gesturing on areas of the screen. The display 16 may be capable of displaying the map 12 of the body of water along with a representation of the marine vessel overlayed thereon.

The user interface 18 generally allows the user to utilize inputs and outputs to interact with the marine navigation device 10. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, or the like, or combinations thereof. With the user interface 18, the user may be able to control the features and operation of the display 16. For example, the user may be able to zoom in and out on the display 16 using either virtual onscreen buttons or actual pushbuttons. In addition, the user may be able to pan the image on the display 16 either by touching and swiping the screen of the display 16 or by using multidirectional buttons or dials.

The communication element 20 generally allows communication with external systems or devices. The communication element 20 may include signal or data transmitting and receiving circuits, such as antennas, amplifiers, filters, mixers, oscillators, digital signal processors (DSPs), and the like. The communication element 20 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 20 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 20 may establish communication through connectors or couplers that receive metal conductor wires or cables or optical fiber cables. The communication element 20 may be in communication with the processing element 26 and the memory element 24.

The location determining element 22 generally determines a current geolocation of the marine navigation device 10 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 22 may accompany or include an antenna to assist in receiving the satellite signals. The antenna may be a patch antenna, a linear antenna, or any other type of antenna that can be used with location or navigation devices. The location determining element 22 may include satellite navigation receivers, processors, controllers, other computing devices, or combinations thereof, and memory. The location determining element 22 may process a signal, referred to herein as a "location signal", from one or more satellites that includes data from which geographic information such as the current geolocation is derived. The current geolocation may include coordinates, such as the latitude and longitude, of the current location of the marine navigation device 10. The location determining element 22 may communicate the current geolocation to the processing element 26.

Although embodiments of the location determining element 22 may include a satellite navigation receiver, it will be appreciated that other location-determining technology may be used. For example, cellular towers or any customized transmitting radio frequency towers can be used instead of satellites may be used to determine the location of the marine navigation device 10 by receiving data from at least three transmitting locations and then performing basic triangulation calculations to determine the relative position of the device with respect to the transmitting locations. With such a configuration, any standard geometric triangulation algorithm can be used to determine the location of the marine navigation device 10. The location determining element 22 may also include or be coupled with a pedometer, accelerometer, compass, or other dead-reckoning components which allow it to determine the location of the device 10. The location determining element 22 may determine the current geographic location through a communications network, such as by using Assisted GPS (A-GPS), or from another electronic device. The location determining element 22 may even receive location data directly from a user.

The memory element 24 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory element 24 may include, or may constitute, a "computer-readable medium". The memory element 24 may store the instructions, code, code segments, software, firmware, programs, applications, apps, services, daemons, or the like that are executed by the processing element 26. The memory element 24 may also store settings, data, documents, sound files, photographs, movies, images, databases, and the like.

In various embodiments, the memory element 24 may further store sonar data, digital elevation model (DEM) data, and the like. The sonar data may be presented in the form of a database and may include the coordinates for a plurality of geolocations and at least one depth of water associated with each geolocation. In various embodiments, the sonar data may be gathered by a separate marine vessel using a sound navigation and ranging (sonar) element. Typically, the sonar element generates a sound beam or wave at one or more frequencies into the water and measures the amount of time that elapses before the reflection of the sound beam from the bottom surface of the body of water or an object is received. In embodiments, the depth of the water or the distance to underwater objects in the path of the beam can be determined from the time delay or other characteristic of the received sonar beam. In addition, the backscatter intensity, the amplitude, the energy level, or a similar characteristic of the returned sound beam may indicate the density of objects in the path of the beam. In the case of the underwater terrain, a hardness value of the soil of the water bottom may be determined from the returned sound beam. The entire body of water may be swept in order to gather the sonar data, such that the sonar data includes substantially all of the geolocations of the body of water, wherein "substantially all" refers to all of the water-covered areas that are navigable by a marine vessel or water craft. The sonar data for the body of water may be stored in the memory element 24 before the marine navigation device 10 is utilized for an outing on the body of water.

The DEM data generally includes location information, such as coordinates for a plurality of geolocations. In embodiments, the location information may be positioned at the intersection points of a geographical grid associated with a particular region of a body of water. Associated with each geolocation is a value for an elevation or height, which is usually the elevation above sea level, of the terrain. The marine navigation device may determine that a geographic location is associated with a body of water based on a depth level determined for the body of water. The DEM data usually covers substantially all of a body of water and typically includes substantially the same geolocations as are included in the sonar data. In addition, the DEM data is typically stored in the memory element 24 before the marine navigation device 10 is utilized for an outing on the body of water.

Figure 3B:
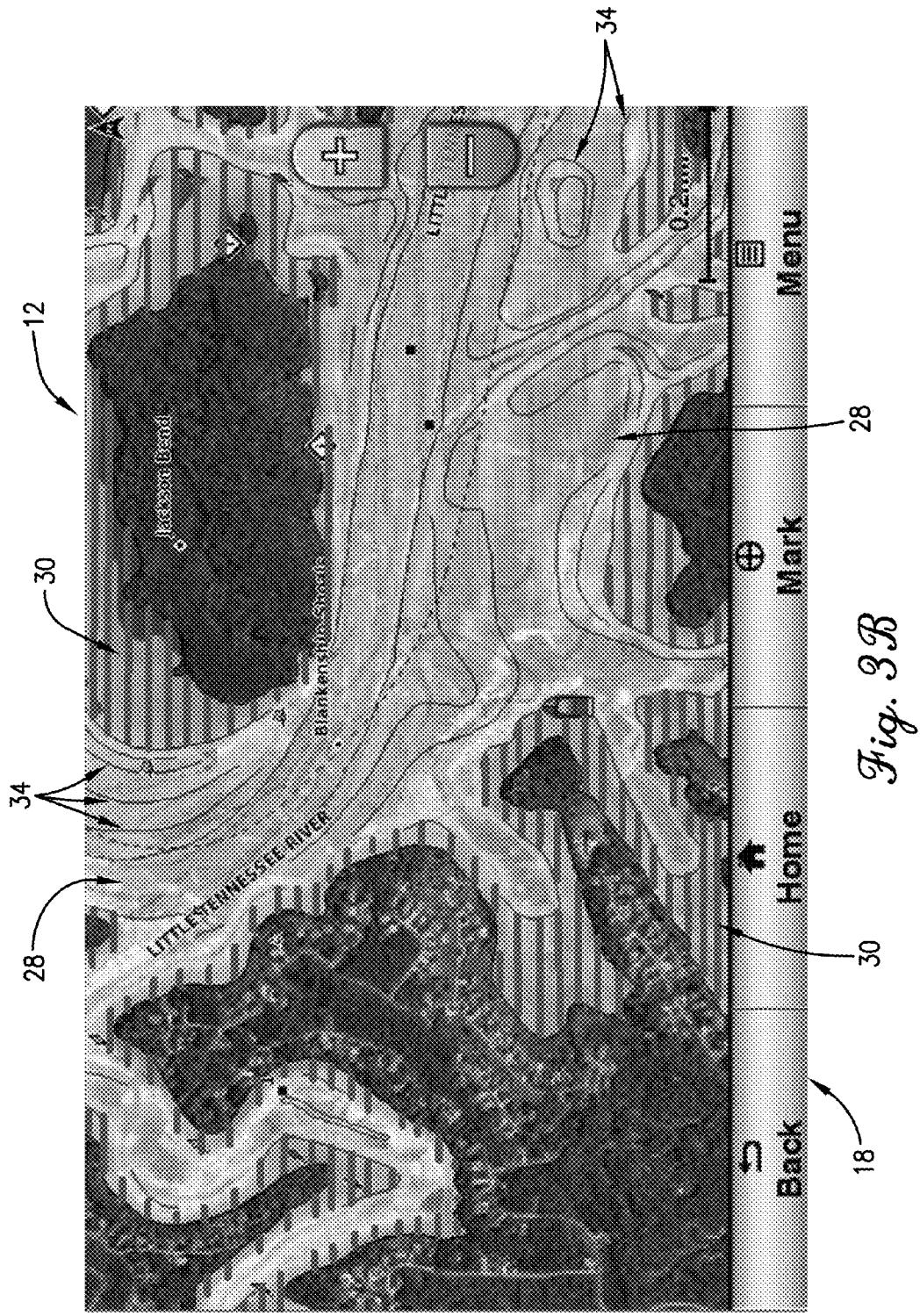
FIG. 3B is a screen capture from the display wherein a plurality of hatching lines indicates the safety shading.

The memory element 24 may further store data for the map 12 that represents the geographic area covered by the body of water as well as the geographic area surrounding the body of water. The memory element 24 may also store contour line data for a plurality of contour lines 34 that are overlayed on the map 12, as shown in FIGS. 3A and 3B. The contour line 34 data may be generated by an external source and stored in the memory element 24. Each contour line 34 may connect all of the geolocations of the terrain that exist at the same depth of water. For example, the memory element 24 may store contour line data for all of the geolocations that are at a depth of 1 foot, 2 feet, 3 feet, and so forth. Alternatively, the memory element 24 may store contour line data for all of the geolocations that are at other ranges of depths, such as every 2 feet, every 5 feet, and so forth. The user may be able to choose the ranges of depths for which a contour line 34 is indicated and shown on the display 16. Generally, there may be multiple contour lines 34 displayed for a body of water for the same depth, as one region may have a first contour line 34 at a first depth while another geographically separated region may have a second contour line 34 at the first depth as well. For example, a underwater terrain for a body of water may have a plurality of elevated and lower portions separated by areas having different depths. Furthermore, each contour line 34 may include a plurality of line segments that are connected to one another to form the contour line 34.

The contour line 34 data stored in the memory element 24 may be configured such that the contour lines 34 have a reduced density, wherein the density may be related to the number of lines per unit area or the spacing between adjacent lines. In order to reduce the density of the contour lines 34, some segments or portions of certain contour lines 34 may not be included in the data if they will appear too close to segments of other contour lines 34 when the map 12 and the overlayed contour lines 34 are shown on the display 16. The specific segments of contour lines 34 to be excluded from the data may be determined based expected characteristics, parameters, or features of the display 16. This reduces clutter created on the display 16 caused by an overabundance of contour lines 34 for a portion of a map 12 displayed with contour lines 34. In addition, the processing element 26 may actively reduce the density of the contour lines 34, as discussed below.

The memory element 24 may also store bottom hardness shading data which can be used to render an image of the soil at the bottom of the body of water with shading 28 that indicates the hardness of the soil, such as the images shown in FIGS. 3A and 3B. The bottom hardness shading data may be generated by an external source and may include a value of a monochromatic shade of a first color for each geolocation occupied by the body of water. In exemplary embodiments, the first color may be white or black such that the monochromatic shade value is a grayscale value. In other embodiments, the first color may be another color, such as brown, and the monochromatic shades may be varying shades of brown. The monochromatic shade value may be based on a hardness value of the soil for the given geolocation and may range from 0 to 255, as an example. The soil hardness values may be retrieved or collected from diving expeditions or the use of a dredging tool. In addition, the soil hardness data may be inferred from historical substrate maps. In an exemplary embodiment, the monochromatic shade values are based on the soil hardness values such that lighter shades of the first color represent soils that are harder or denser, while darker shades represent softer or less dense soils. In addition, the processing element 26 may generate the bottom hardness shading data, as discussed below.

The processing element 26 may include processors, microprocessors, microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like, or may step through states of a finite-state machine, or combinations of these actions. The processing element 26 may be in communication with the other electronic components through serial or parallel links that include address busses, data busses, control lines, and the like.

The processing element 26 may be configured to determine the features of the content that is shown on the display 16. For example, the processing element 26 may determine the location and size of the user interface 18 portion of the display 16 as well as the location and size of the map 12. The processing element 26 may also be configured to determine the content of the map 12, based on factors such as the current geolocation of the marine vessel as well as settings chosen by the user such as the zoom level, among other factors.

In some embodiments, as an alternative to having predetermined bottom hardness shading data stored in the memory element 24, the processing element 26 may be configured to calculate, compute, or determine the bottom hardness shading data in order to implement the bottom hardness shading 28. The bottom hardness shading data generated by the processing element 26 may be substantially similar to the bottom hardness shading data that is stored in the memory element 24. The processing element 26 may assign the monochromatic shade value of the first color for each geolocation based on the hardness value of the soil in that location. The soil hardness values may be derived from the sonar data. As with the bottom hardness data stored in the memory element 24, the processing element 26 may generate monochromatic shade values such that lighter shades of the first color represent soils that are harder or denser, while darker shades represent softer or less dense soils. The monochromatic shades indicated by the bottom hardness shading data may be overlayed on the map 12, as shown in FIGS. 3A and 3B.

The processing element 26 may also be configured to calculate, compute, or determine depth shading data. From the memory element 24, the processing element 26 may receive the sonar data, the DEM data, or both. While the DEM data may provide only elevation data, water depth data can be derived from the DEM data. The depth shading data may include a shade of a color value for at least a portion of the geolocations of the body of water—typically for those geolocations whose depth of water meets a certain criteria. For example, the processing element 26 may implement a safety shading 30 to highlight shallow water areas of the body of water. Thus, the depth shading data may include an incrementally varying shade value of a second color for those areas of the body of water that have a depth of a first depth threshold or less. For example, the first depth threshold may be 20 feet. Accordingly, the processing element 26 may determine a shade value of the second color for those geolocations which are to be displayed on the map 12 whose depth is included in the range from 0 feet to 20 feet. The color shade value may vary according to an interval, such as every foot, every 2 feet, or so forth. In exemplary embodiments, the color shades may be increasingly darker as the depth of water decreases, such that the darkest color shade is assigned to the shallowest water. In addition, exemplary colors may include purple or blue. The safety shading 30 indicated by the depth shading data may be overlayed on the map 12, as seen in FIG. 3A. FIG. 3B also shows safety shading 30, wherein the safety shading 30 is indicated by horizontal hatching lines to more clearly highlight the safety shading 30 in the shallow water areas.

In certain embodiments, the processing element 26 may generate depth shading data to further include a value of a single color for those geolocations with a depth between a given range or a depth greater than a given value. In exemplary embodiments, the processing element 26 may generate depth shading data to include a value for the color magenta, or a similar color, for those geolocations with a depth at a certain range. The color may be overlayed on the map 12. Thus, those geolocations with a depth, for example, greater than 50 feet may appear on the map 12 shaded in magenta.

Figure 4:
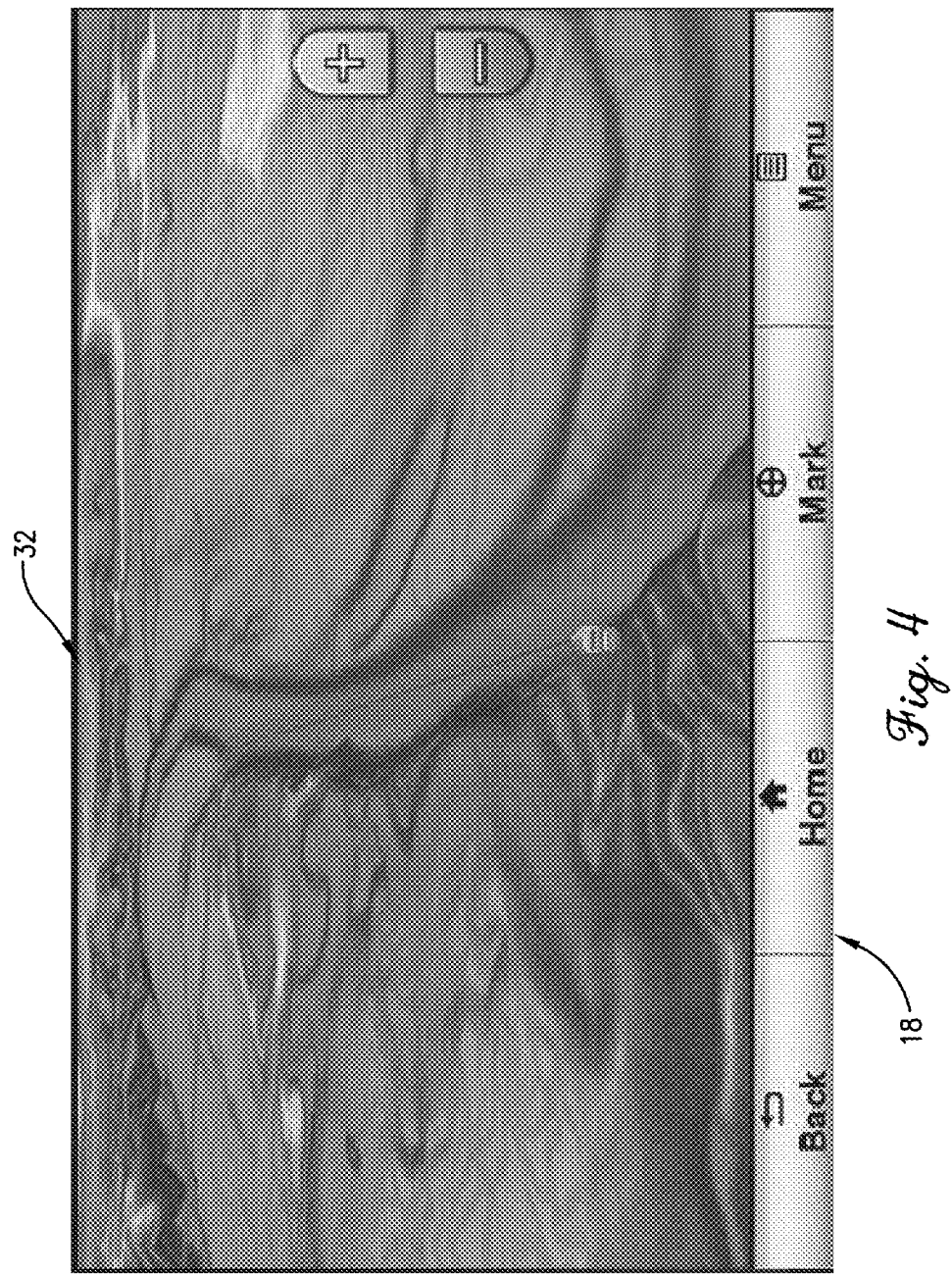
FIG. 4 is a three-dimensional image of the body of water.

The processing element 26 may further be configured to calculate, compute, or determine three-dimensional terrain data from the sonar data, the DEM data, or both. The three-dimensional terrain data may be utilized to create a three-dimensional image 32 of the body of water as seen from an overhead perspective that is behind the marine vessel. As appropriate according to zoom level settings and proximity to land of the marine vessel, the three-dimensional image 32 may further include a three-dimensional perspective representation of the land at the shoreline of the body of water. In addition, the three-dimensional terrain data may include relief shading to indicate shadows of the underwater terrain as created by a natural or artificial light source. The processing element 26 may communicate the three-dimensional image 32 derived from the three-dimensional terrain data to the display 16, as shown in FIG. 4, instead of communicating the map 12 to the display 16. The representation of the marine vessel may be overlayed on the three-dimensional image 32 at a position corresponding to the current geolocation of the marine vessel.

The processing element 26 may also be configured to determine a route along the body of water from the current geolocation of the marine vessel to a user-specified geolocation. The processing element 26 may determine the route based on the sonar data, the DEM data, or both. For example, the route may be plotted through areas of the body of water that are deep enough for the marine vessel to safely navigate or areas that have relatively hard soil. In addition, when shown on the display 16, the route may be overlayed on the map 12 or on the three-dimensional image 32 of the body of water.

In some embodiments, as an alternative to having predetermined contour line 34 data stored in the memory element 24, the processing element 26 may additionally be configured to determine contour line data for the contour lines 34 similar to the contour line 34 data stored in the memory element 24. The sonar data, the DEM data, or both may be utilized in determining the contour line data.

The density of the contour lines 34, when they are shown on the display 16, may depend on a number of factors, such as a zoom level of the map 12 on the display 16, the depth range of the contour lines 34, and the topography of the underwater terrain, among other factors. In some embodiments, the contour line density is similar for varying zoom levels of the map 12. In other embodiments, the contour line density is inversely proportional to the zoom level of the map 12, wherein a larger zoom level (zooming in) generally results in a lower contour line density and greater space between adjacent contour lines 34, while a smaller zoom level (zooming out) results in a greater contour line density and less space between adjacent contour lines 34. In addition, the contour line density may be inversely proportional to the depth range, wherein a larger depth range (e.g., 10 feet) results in a lower contour line density, while a smaller depth range (e.g., 1 foot) results in a greater contour line density.

The user may, to a certain extent, control the contour line density by adjusting the zoom level of the map 12 on the display 16, adjusting the contour line depth range, or both. However, in some situations, the contour line density may be high in certain areas of the map 12 even after the zoom level and the depth range have been adjusted. Typically, these onscreen areas correspond to areas of the underwater terrain where there are large gradients. The user may choose to not change the appearance of the contour lines 34 on the map 12, or he may have the option of reducing the density of contour lines 34 as described below.

In embodiments, the processing element 26 may determine a line to line distance as a distance between adjacent contour lines 34 before they are shown on the map 12, based on the current settings for the display 16 zoom level or the contour line depth range. A contour line threshold value for the line to line distance may be used to reduce the density of contour lines 34 displayed on the map 12. The contour line threshold value may be a distance between geographic locations associated with the underwater terrain (e.g., 10 feet between geographic coordinates associated with adjacent contour lines 34) or a display distance between contour lines 34, which may vary based on the size of display 16 (e.g., one-sixteenths of an inch between points of adjacent contour lines 34 presented on an 8-inch display 16). The contour line threshold value may be established either at the time of production for the marine navigation device 10 or by the user during usage of the device 10. For portions of the contour lines 34 having a line to line distance is less than the contour line threshold value, the processing element 26 may reduce the contour line density by removing one or more segments from one or more contour lines 34. The processing element 26 may update the contour line data before the contour lines 34 are presented on the map 12. If the line to line distance is greater than or equal to the contour line threshold, then the contour lines 34 may be shown on the map 12 without modification.

In an exemplary embodiment, the processing element 26 may perform the following actions to reduce the contour line density, or thin the presented contour lines 34, before the contour lines 34 are shown on the map 12. The processing element 26 may determine an area of the body of water having a group of three or more contour lines 34 such that the line to line distance of each adjacent pair of contour lines 34 is less than the contour line threshold value, as shown in FIG. 5, wherein there are two such groups. The processing element 26 may determine a window 36 that surrounds the area, such as the two windows shown in FIG. 5. (Although two windows 36 are shown in FIG. 5, the windows 36 are not actually drawn on the map 12 shown on the display 16. The windows 36 are shown in the figures to illustrate part of an exemplary process of reducing the contour lines 34 presented on display 16.) The processing element 26 may utilize the windows 36 to group adjacent contour lines 34 that may be reduced in density to improve the user experience when viewing the map 12 on display 16. The processing element 26 may determine the two outermost contour lines 34 in the window 36 and identify those outermost contour lines 34 for continued presentation. For the contour lines 34 in between the two outermost contour lines 34, the processing element 26 may remove the segments of those contour lines 34 that lie within the window 36, as shown in FIG. 6. This reduces the density of contour lines 34 presented for a portion of a body of water and thereby reduces the obstruction of map 12 by contour lines 34. Typically, each contour line 34 includes at least a segment or a portion that is extends beyond the perimeter of the window 36. In embodiments, a contour line 34 having a portion thereof removed in a first window 36 may have the remaining portions of the contour line 34 presented on display 16, which may include an adjacent second window 36. In some cases, the processing element 26 may remove an entire contour line 34, if the contour line 34 begins and ends within the window 36. Once the contour line data has been updated, then the processing element 26 may communicate the contour line data to the display 16 to be shown as contour lines 34 on the body of water portion of the map 12, as shown in FIGS. 3A and 3B. As shown in FIG. 6, the reduced contour lines 34 enables a user to view more map information presented on display 16, when compared to the original contour lines 34 shown in FIG. 5. In embodiments, the number and location of windows 36 may be automatically determined based on the current zoom level. For example, a group of contour lines 34 that may not be presented close to one another when display 16 presents map 12 and other information for a geographic area using an increased zoom level may be presented close to one another when the zoom level is decreased (a larger portion of map 16 is presented as a result). This dynamic grouping of contour lines 34 based on a current zoom level of display 16 by processing element 26 enables the outermost contour lines 34 to be presented on display 16 in an intuitive and user friendly manner.

While the marine vessel moves around the body of water, the area of the body of water that is shown in the map 12 changes. Accordingly, the processing element 26 may repeatedly evaluate the line to line distance of the contour lines 34 that are shown in the map 12. As necessary, the processing element 26 may update the contour line data to reduce the contour line density by removing one or more segments from one or more contour lines 34. In addition, the processing element 26 may update the contour line data when the user changes the zoom level or the contour line depth range.

The marine navigation device 10 may operate as follows. The device 10 may be utilized with a marine vessel that is engaging in boating activities on a body of water. The device 10 may assist a user in determining his current geolocation, generally navigating around the water, or the like. The display 16 of the device 10 may show the map 12 and the marine vessel overlayed on the map 12 at the current geolocation, as shown in FIGS. 3A and 3B.

If so desired, the user may select any combination of a plurality of options for viewing information regarding the body of water. Through the user interface 18, the user may apply bottom hardness shading 28 and safety shading 30 to the map 12. In response, the processing element 26 may generate or adjust the bottom hardness shading data, the depth shading data, or both, as appropriate. Alternatively, the processing element 26 may retrieve and utilize the previously-stored bottom hardness shading data that is overlayed on the map 12. In addition, the user may select the three-dimensional image 32 to be shown on the display 16, as seen in FIG. 4, and the processing element 26 may generate or adjust the three-dimensional terrain data. Furthermore, the user may choose to plot a course from his current geolocation to a specific destination, and the processing element 26 may determine a route which is overlayed on the map 12 or the three-dimensional image 32. The user may also choose to thin the contour lines 34 as they appear on the map 12. In those areas where the line to line distance of the contour lines 34 is below the contour line threshold value (indicating high contour line density), the processing element 26 may update the contour line data to reduce the contour line density. Alternatively, the processing element 26 may retrieve and utilize the previously-stored contour line 34 data that has an already reduced line density, which eliminates the need for the processing element 26 to perform any calculations on the contour line 34 data. The user may zoom in or out on the map 12 or the three-dimensional image 32 using the user interface 18. The user may also pan around on the map 12 or the three-dimensional image 32 in order to see areas of the body of water away from the current geolocation of the marine vessel.

The marine navigation device 10 may show useful information regarding the body of water on the map 12 in the form of shading and contour lines 34. The bottom hardness shading 28 and safety shading 30 as well as the contour lines 34 may help the user safely navigate the marine vessel along the body of water. They may also help the user find good fishing and swimming areas. The processing element 26 may declutter the contour lines 34 that are shown on the map 12 by maintaining the line to line distance between adjacent contour lines 34 at or above the contour line threshold value. Since the display 16 may show shading information in the same area of the map 12 as the contour lines 34, selectively removing contour line 34 segments in high-density areas may allow the user to more easily see the shading.

Although the technology has been described with reference to the embodiments illustrated in the attached drawing figures, it is noted that equivalents may be employed and substitutions made herein without departing from the scope of the technology as recited in the claims.

What is claimed is:

1. A marine navigation device comprising:
   a location determining element configured to determine a current geolocation of a marine vessel on a first body of water;
   a display;
   a memory element configured to store digital elevation model data or sonar data for one or more bodies of water; and
   a processing element in communication with the memory element and the display, the processing element configured to—
   select the digital elevation model data or the sonar data from the memory element corresponding to the first body of water,
   calculate contour line data using the digital elevation model data or the sonar data for at least a portion of the first body of water, the contour line data determining a plurality of contour lines, each contour line indicating all of the geolocations of underwater terrain that exist at a depth of water,
   identify a high contour line density area having at least three adjacent contour lines within a threshold distance;
   update the contour line data to reduce contour line density in the high contour line density area by selectively removing at least a portion of the at least three adjacent contour lines in the high contour line density area,
   generate a map representation of at least a portion of the first body of water corresponding to the current geolocation, the map representation including contour lines derived from the updated contour line data, and
   control the display to visually present the map representation.

2. The marine navigation device of claim 1, wherein the processing element identifies the high contour line density area by determining a line to line distance for adjacent contour lines and updates the contour line data by removing at least a portion of the contour lines in the high contour line density areas where the line to line distance is below a threshold value.

3. The marine navigation device of claim 2, wherein the line to line distance for adjacent contour lines is determined based on a zoom level of the map representation and a contour line depth range.

4. The marine navigation device of claim 3, wherein the zoom level is related to a size of an area of the first body of water that is displayed on the map representation.

5. The marine navigation device of claim 3, wherein the contour line depth range is determined by a value of the depth for which a contour line is displayed on the map representation.

6. The marine navigation device of claim 1, wherein the processing element identifies the high contour line density area by determining where a line to line distance for each adjacent pair of at least three adjacent contour lines is below the threshold value, and wherein the processing element is further configured to —
- determine a window that surrounds the high contour line density area,
- determine the two outermost contour lines in the window, and
- remove segments of contour lines that lie within the window for the contour lines in between the two outermost contour lines.

7. The marine navigation device of claim 1, wherein the digital elevation model data includes a plurality of geolocations, each geolocation associated with an elevation value.

8. The marine navigation device of claim 1, wherein the sonar data includes a plurality of geolocations, each geolocation associated with a depth value.

9. The marine navigation device of claim 1, wherein the selective removal of at least a portion of the contour lines reduces the density of contour lines in the high contour line density area.

10. The marine navigation device of claim 1, wherein the processing element identifies the high contour line density area based on the number of contour lines in a geographic area.

11. The marine navigation device of claim 10, wherein the processing element counts the number of contour lines in the geographic area per unit length.

12. The marine navigation device of claim 10, wherein the processing element counts the number of contour lines in the geographic area per unit area of the display.

13. The marine navigation device of claim 1, wherein the processing element identifies that a geographic area associated with underwater terrain having a large gradient or slope is a high contour line density area.

14. A marine navigation device comprising:
- a location determining element configured to determine a current geolocation of a marine vessel on a first body of water;
- a display;
- a memory element configured to store digital elevation model data or sonar data for one or more bodies of water; and
- a processing element in communication with the memory element and the display, the processing element configured to—
  - select the digital elevation model data or the sonar data from the memory element corresponding to a first body of water,
  - calculate contour line data using the digital elevation model data or the sonar data for at least a portion of the first body of water, the contour line data determining a plurality of contour lines, each contour line indicating all of the geolocations of underwater terrain that exist at a depth of water,
  - determine a line to line distance for adjacent contour lines,
  - update the contour line data to reduce contour line density by removing at least a portion of at least one of the adjacent contour lines in high contour line density areas where the line to line distance is below a threshold value,
  - generate a map representation of at least a portion of the first body of water corresponding to the current geolocation, the map representation including contour lines derived from the updated contour line data, and
  - control the display to visually present the map representation.

15. The marine navigation device of claim 14, wherein the processing element is further configured to—
- determine a high contour line density area where a line to line distance for each adjacent pair of at least three adjacent contour lines is below the threshold value,
- determine a window that surrounds the high contour line density area,
- determine the two outermost contour lines in the window, and
- remove segments of contour lines that lie within the window for the contour lines in between the two outermost contour lines.

16. The marine navigation device of claim 14, wherein the line to line distance for adjacent contour lines is determined based on a zoom level of the map representation and a contour line depth range.

17. The marine navigation device of claim 16, wherein the zoom level is related to a size of an area of the first body of water that is displayed on the map representation.

18. The marine navigation device of claim 16, wherein the contour line depth range is determined by a value of the depth for which a contour line is displayed on the map representation.

19. The marine navigation device of claim 14, wherein the digital elevation model data includes a plurality of geolocations, each geolocation associated with an elevation value.

20. The marine navigation device of claim 14, wherein the sonar data includes a plurality of geolocations, each geolocation associated with a depth value.

21. The marine navigation device of claim 14, wherein the removal of at least a portion of at least one of the adjacent contour lines reduces the density of contour lines in the high contour line density area.

22. The marine navigation device of claim 14, wherein the high contour line density areas include a plurality of contour lines in a geographic area.

23. The marine navigation device of claim 22, wherein the processing element counts the number of contour lines in the geographic area per unit length.

24. The marine navigation device of claim 22, wherein the processing element counts the number of contour lines in the geographic area per unit area of the display.

25. The marine navigation device of claim 14, wherein the processing element identifies a geographic area associated with underwater terrain having a large gradient or slope as a high contour line density area where the line to line distance is below a threshold value.

26. A marine navigation device comprising:
- a location determining element configured to determine a current geolocation of a marine vessel on a first body of water;
- a display;
- a memory element configured to store digital elevation model data or sonar data for one or more bodies of water; and
- a processing element in communication with the memory element and the display, the processing element configured to—
  - select the digital elevation model data or the sonar data from the memory element corresponding to the first body of water,
  - calculate contour line data using the digital elevation model data or the sonar data for at least a portion of the first body of water, the contour line data determining a plurality of contour lines, each contour line indicating all of the geolocations of underwater terrain that exist at the depth of water, determine a line to line distance for adjacent contour lines, determine an area where the line to line distance for each adjacent pair of at least three adjacent contour lines is below the threshold value, determine a window that surrounds the area, determine the two outermost contour lines in the window, update the contour line data by removing segments of contour lines that lie within the window for the contour lines in between the two outermost contour lines, generate a map representation of at least a portion of the first body of water corresponding to the current geolocation, the map representation including contour lines derived from the updated contour line data, and control the display to visually present the map representation.

27. The marine navigation device of claim 26, wherein the line to line distance for adjacent contour lines is determined based on a zoom level of the map representation and a contour line depth range.

28. The marine navigation device of claim 27, wherein the zoom level is related to a size of an area of the first body of water that is displayed on the map representation.

29. The marine navigation device of claim 27, wherein the contour line depth range is determined by a value of the depth for which a contour line is displayed on the map representation.

30. The marine navigation device of claim 26, wherein the digital elevation model data includes a plurality of geolocations, each geolocation associated with an elevation value and the sonar data includes a plurality of geolocations, each geolocation associated with a depth value.

31. The marine navigation device of claim 26, wherein the removal of a segment of at least one of the adjacent contour lines that lie within the window reduces the density of contour lines in the area.

32. The marine navigation device of claim 26, wherein the processing element determines the area based on the number of contour lines in a geographic area.

33. The marine navigation device of claim 32, wherein the processing element counts the number of contour lines in the geographic area per unit length.

34. The marine navigation device of claim 32, wherein the processing element counts the number of contour lines in the geographic area per unit area of the display.

35. The marine navigation device of claim 26, wherein the processing element determines that a geographic area associated with underwater terrain having a large gradient or slope is an area where the line to line distance for each adjacent pair of at least three adjacent contour lines is below the threshold value.

* * * * *